No. 663,986. Patented Dec. 18, 1900.
J. E. THORNYCROFT.
STEERING APPARATUS FOR MOTOR VEHICLES.
(Application filed Jan. 10, 1900.)
(No Model.) 2 Sheets—Sheet 1.
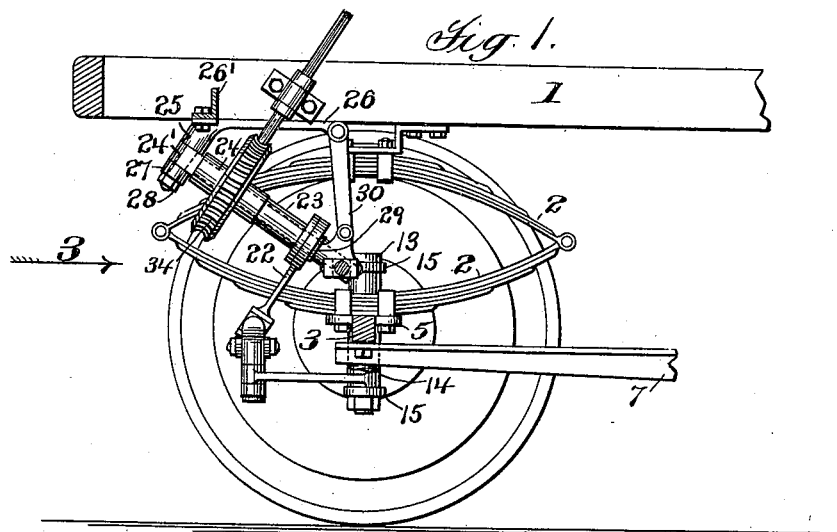
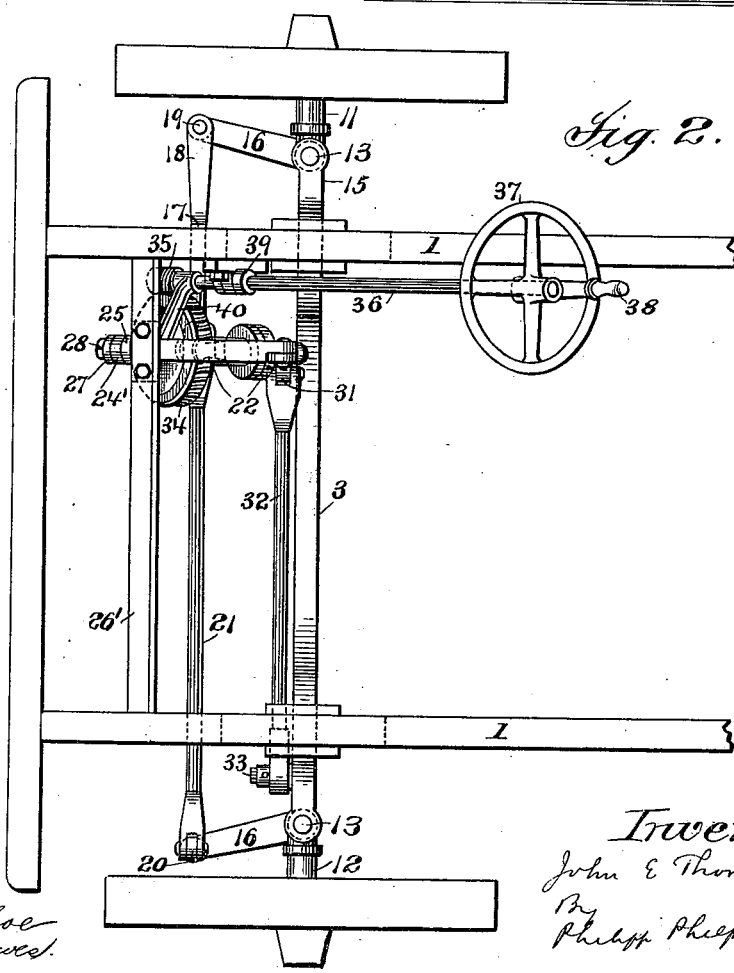

No. 663,986. Patented Dec. 18, 1900.
J. E. THORNYCROFT.
STEERING APPARATUS FOR MOTOR VEHICLES.
(Application filed Jan. 10, 1900.)
(No Model.) 2 Sheets—Sheet 2.
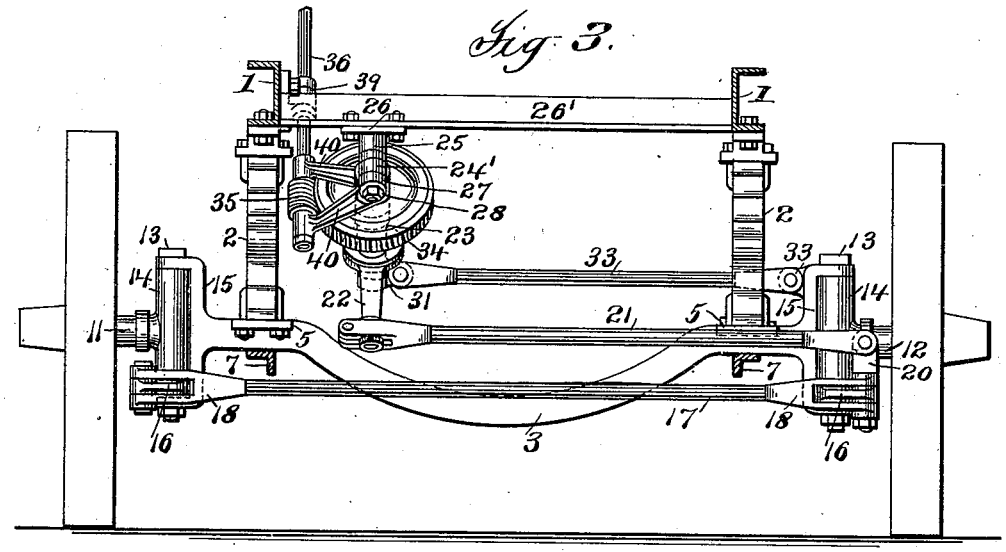
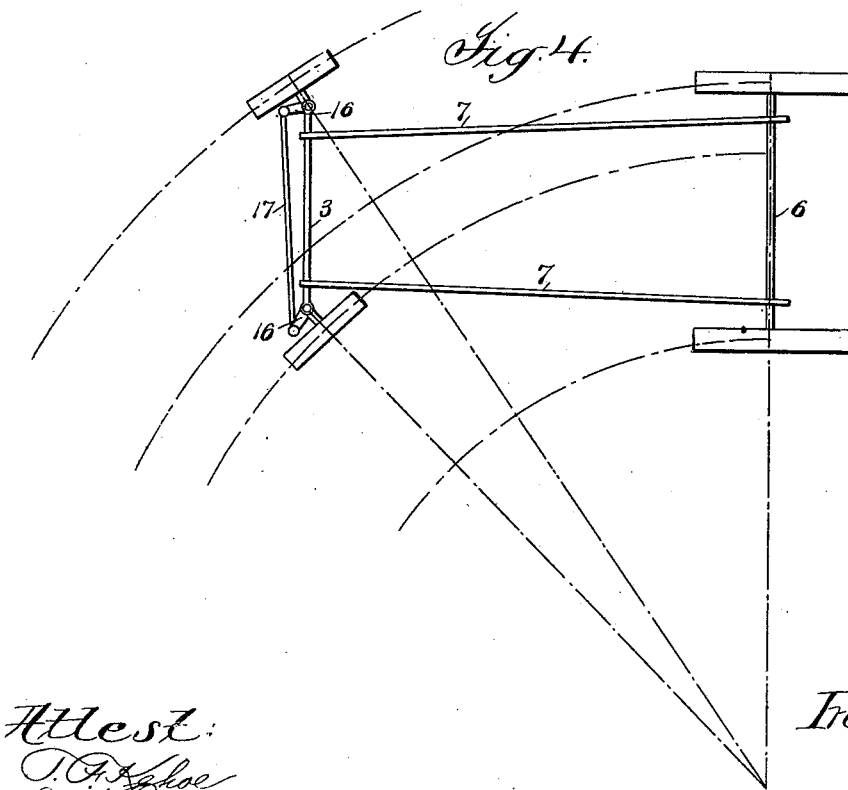

UNITED STATES PATENT OFFICE.

JOHN EDWARD THORNYCROFT, OF LONDON, ENGLAND.

STEERING APPARATUS FOR MOTOR-VEHICLES.

SPECIFICATION forming part of Letters Patent No. 663,986, dated December 18, 1900.

Original application filed October 16, 1899, Serial No. 733,735. Divided and this application filed January 10, 1900. Serial No. 977. (No model.)

*To all whom it may concern:*

Be it known that I, JOHN EDWARD THORNYCROFT, a subject of the Queen of Great Britain and Ireland, residing at Chiswick, London, county of Middlesex, England, have invented certain new and useful Improvements in Steering Apparatus for Motor-Vehicles, fully described and represented in the following specification and the accompanying drawings, forming a part of the same.

This invention relates to certain improvements in steering mechanism for motor-vehicles, and is a division of my application, Serial No. 733,735, filed October 16, 1899.

The object of the invention is to produce an improved steering mechanism which shall be self-locking, in which the movement of the frame on its springs has no tendency to turn the steering-wheels, in which the side swaying of the vehicles does not throw any strain upon the steering mechanism, and in which the act of steering throws no strain on the carrying-springs.

With this and other objects in view the invention consists in certain constructions and in certain parts, improvements, and combinations, as will be hereinafter described, and more particularly pointed out in the claims hereunto appended.

In the accompanying drawings, which form a part of this specification, and in which like characters of reference indicate the same parts, Figure 1 is a sectional elevation of the forward end of a motor-vehicle, illustrating the construction of the improved steering apparatus and the manner of mounting the same. Fig. 2 is a plan view of the construction shown in Fig. 1. Fig. 3 is a front view of the construction shown in Fig. 1, the view being taken in the direction of the arrow 3 in that figure. Fig. 4 is a diagram illustrating the operation of the steering mechanism.

Referring to the drawings, 1 indicates the main supporting-frame of the vehicle. This frame is preferably spring-supported and is shown as supported on double-bow leaf-springs 2, these springs being secured to the forward axle 3 in any suitable manner, as by means of clevis-bolts which pass through eyes 5, formed on or secured to the main axle. While double-bow leaf-springs are deemed preferable, any other form of supporting-springs may be used. The front axle 3 is connected to the rear axle 6 by means of side bars 7, which may be of any suitable construction, but are preferably formed of angle-iron, these bars forming a rigid perch-frame. The front axle 3 is provided with two short extensions 11 12, these extensions being pivoted to the axle 3 by bolts 13, which pass through sockets 14 on the extensions, the sockets being contained between bracket-arms 15 on the axle. The sockets 14 are provided with outwardly-inclined arms 16, these arms being connected for simultaneous movement by a rod 17, which rod is preferably provided with yoked ends 18, into which the arms 16 take, the arms and yokes being pivoted together by bolts 19. One of the yokes 18, herein shown as the one adjacent to the extension 12, is provided with a lug 20. To this lug 20 is pivoted one end of a link 21, the other end of the link 21 being pivoted to an arm 22, which is fast on a worm-wheel shaft 23. The worm-wheel shaft is perforated and is mounted on a rod 24, which passes through it. The rod 24 is provided with the perforated end 24', and through this perforation passes a shouldered pin 25, fast on a bracket 26, said bracket 26 being suitably secured to an angle-bar 26', supported on and forming a part of the main frame 1. The rod 24 is held on the pin by a washer 27 and nut 28 or in any other suitable manner. The lower or inner end of the rod 24 is supported in a hanger 29, which is carried on a flexible or spring connecting bar or link 30, pivoted to the bracket 26, before referred to. The hanger 29 is provided with a lug 31, to which is connected a radius-rod 32. The other end of this rod 32 is secured to the axle in any suitable manner, as by a pin 33 passing through one of the bracket-arms 15, though it might be secured to any part of the perch-frame.

The worm-wheel shaft 23 carries a worm-gear 34, said worm-gear being engaged by a worm 35, mounted on a worm-shaft 36. This shaft is preferably inclined and is provided at its upper end with an operating-wheel 37 and a handle 38. The shaft at its lower end passes through a bearing 39, secured to the frame, and is also further supported by a twoarmed bracket 40, said bracket being supported by the worm-wheel shaft and engaging the shaft 36 above and below the worm.

It is necessary for efficient steering that the axes of the leading wheels when projected should always intersect on the line which forms the projection of the axis of the rear axle. This is effected by inclining the arms 16 outwardly. The effect of thus inclining the arms will be clearly understood from the diagram in Fig. 4. In this figure it will be seen that in turning the wagon the inner wheel is turned farther inward or given more of a cramp than the outer wheel. The result of this is to cause the inner wheel to travel on a much smaller circle proportionate to the amount of turn given the wheels than if the arms 16 were arranged at right angles to the short extensions 11 12. It will be further seen that with the steering-gear arranged as described the up-and-down movement of the frame on its spring does not tend to move the gear, and, furthermore, any side sway which the upper part of the vehicle has is also taken up by the flexible supporting-link 30, and thus no strain is put on the steering-gear. Furthermore, the necessary reaction to the strain caused by operating the steering-wheel is taken up by the radius-rod 32, and the act of steering therefore produces no side strain on the springs. Furthermore, the worm-steering arrangement is self-locking, so that the driver after setting his steering apparatus is free to remove his hands from the wheel.

It is to be understood that the invention which has been heretofore described is not limited to the precise details of construction which have been described and illustrated. Many changes in construction and arrangement will suggest themselves to skilled mechanics, and it is to be understood that such changes and variations are within the scope of the invention.

What I claim is—

1. In a motor-propelled vehicle, the combination with a rigid axle, of a spring-supported body carried thereby, a pair of pivoted extensions on the axle, a pair of wheels carried by the extensions, a shaft mounted on the spring-supported body and having a pivotal and spring connection therewith, connections between the shaft and the wheels, whereby rotation of the shaft produce a steering movement of the wheels, and a radius-bar connecting the shaft and the axle and acting in opposition to the forces developed by the steering movement, substantially as described.

2. In a motor-propelled vehicle, the combination with a rigid axle, of a pair of extensions carried thereby, a pair of wheels carried by the extensions, inclined arms secured to the extensions, connections between the arms, a spring-supported body carried by the axle, an inclined shaft pivoted to the body at one end having its other end connected to the body by a spring, an arm on the shaft, a link connecting said arm and one of the extensions, whereby a movement of the shaft produces a steering movement of the wheels, a radius-bar between the shaft and the axle and acting in opposition to the forces developed by the steering movement, and means for rotating the shaft, substantially as described.

3. In a motor-propelled vehicle, the combination with a rigid axle, of a pair of extensions carried thereby, a pair of wheels carried by the extensions, inclined arms secured to the extensions, connections between the arms, a spring-supported body carried by the axle, a shaft mounted on said body and having a pivotal and spring connection therewith, an arm on the shaft, a link connecting said arm and one of the extensions, whereby a movement of the shaft produces the steering movement of the wheels, a radius-bar between the shaft and the axle and acting in opposition to the forces developed by the steering movement, and a worm and worm-wheel for rotating the shaft, substantially as described.

4. In a motor-propelled vehicle, the combination with an axle, of a pair of wheels connected thereto, a spring-supported body mounted on the axle, a support pivoted on the body at one end and having its other end flexibly connected thereto, a shaft on said support, an arm extending from the shaft, connections between said arm and the wheels whereby a movement of the arms produces a steering movement of the wheels, a radius-bar connecting the support and the axle and acting in opposition to the forces developed by the steering movement, and means for rotating the shaft, substantially as described.

5. In a motor-propelled vehicle, the combination with a spring-supported frame, of a steering mechanism having a pivotal and spring connection with the frame, a rigid frame, a pair of wheels, pivotal connections for the wheels, connections between said pivotal connections and the steering mechanism, and means for operating the steering mechanism, substantially as described.

6. In a motor-propelled vehicle, the combination with an axle, of a pair of wheels connected thereto, a spring-supported body mounted on the axle, a support pivoted on the body at one end and having its other end flexibly connected thereto, a shaft on said support, an arm extending from the shaft, connections between said arm and the wheels whereby a movement of the arms produces a steering movement of the wheels, a radius-bar connecting the support and the axle and acting in opposition to the forces developed by the steering movement, and a worm and worm-wheel for rotating the shaft, substantially as described.

7. In a motor-propelled vehicle, the combination with an axle, of a pair of wheels connected thereto so as to have a steering movement, a spring-supported body mounted on the axle, a support pivoted on the body at one end and having its other end flexibly connected thereto, a shaft mounted on the support and carrying a worm-wheel, a pair of arms mounted on the support and carrying a worm, connections between the shaft and the wheels whereby a rotation of the shaft produces a steering movement of the wheels, and a radius-bar rigidly connecting the support and the axle and acting in opposition to the forces developed by the steering movement, substantially as described.

8. In a motor-propelled vehicle, the combination with an axle, of a spring-supported body mounted thereon, a pair of wheels connected to the axle so as to have a steering movement, a steering device carried by the spring-supported body and having a pivotal and spring connection therewith, connections between said device and the wheels, and a connection between said device and a rigid portion of the vehicle, said connection operating in opposition to the forces developed by the steering movement, substantially as described.

9. In a motor-propelled vehicle, the combination with a rigid axle having extensions pivoted thereto, of a pair of wheels mounted on the extensions, inclined arms connected with the extensions, connections between the arms, a spring-supported body mounted on the axle, a steering-shaft flexibly connected to the body, an arm on said shaft, connections between said arm and one of the extensions on which the wheels are mounted, a radius-bar connecting the axle and the shaft, a worm-wheel carried by the shaft, and a suitably-mounted worm for turning the wheel, substantially as described.

10. In a motor-vehicle, the combination with a rigid axle having extensions pivoted thereto, of a pair of wheels pivoted on the extensions, arms connected with the extensions, connections between the arms, a spring-supported body, a steering-shaft pivotally connected to the body at one end and having its other end connected thereto by a spring, an arm on the shaft, means whereby the arm operates the arms connected with the extensions to turn the wheels, a radius-bar connecting the shaft and a rigid part of the vehicle, a worm-wheel mounted on the shaft, and a worm-shaft and worm for turning the wheel, substantially as described.

In testimony whereof I have hereunto set my hand in the presence of two subscribing witnesses.

JOHN EDWARD THORNYCROFT.

Witnesses:
  WM. O. BROWN,
  H. MAYKELS.